CONDENSED DIALING ARRANGEMENT

Filed Aug. 22, 1962 4 Sheets-Sheet 1

INVENTOR
O. H. WILLIFORD
BY Howard R Popper
ATTORNEY

Dec. 8, 1964 O. H. WILLIFORD 3,160,713

CONDENSED DIALING ARRANGEMENT

Filed Aug. 22, 1962 4 Sheets-Sheet 2

INVENTOR
O. H. WILLIFORD
BY Howard R Popper
ATTORNEY

CONDENSED DIALING ARRANGEMENT

Filed Aug. 22, 1962 4 Sheets-Sheet 3

INVENTOR
O. H. WILLIFORD
BY Howard R Popper
ATTORNEY

CONDENSED DIALING ARRANGEMENT

Filed Aug. 22, 1962 4 Sheets-Sheet 4

INVENTOR
O. H. WILLIFORD
BY Howard R Popper
ATTORNEY

United States Patent Office 3,160,713

Patented Dec. 8, 1964

3,160,713
CONDENSED DIALING ARRANGEMENT

Oscar H. Williford, Bronxville, N.Y., assignor to Bell Telephone Laboratories, Incorporated, New York, N.Y., a corporation of New York Filed Aug. 22, 1962, Ser. No. 218,718
12 Claims. (Cl. 179—18)

This invention relates to abbreviated dialing of telephone directory numbers and more particularly to a system enabling a PBX extension user to dial a frequently called telephone number by using fewer digits than are normally required.

The advent of nationwide dialing has made fingertip access to literally tens of millions of telephones a reality. However, when the caller has occasion to re-dial the same seven, ten, or thirteen digit number several times during the day, he is less likely to appreciate the ease and simplicity of direct distance dialing as compared to prior toll operator systems. A particularly noticeable instance of such usage may be found to occur in almost any business organization having a private branch exchange through which calls are repetitively placed to the same suppliers, material men, customers, outlying factories, and branch offices. While the needs of different business organizations vary as to the number and location (area-wise) of such frequently called telephones, a traffic analysis will usually show that for a medium to large size business organization, such as might utilize a PBX of the size and complexity of the Western Electric 701 type, a repertory of about fifty telephone numbers would satisfy the requirements of most customers.

The mitigation of dialing fatigue has heretofore been attempted by resorting to either of two approaches, one employing repertory dialing telephone sets and the other employing random-access magnetic drum circuits at the central office. While both such systems are satisfactory, the first requires the use of a fairly costly unit of apparatus on a per-extension basis and the second involves a sophisticated electronic apparatus the maintenance and installation of which poses somewhat of a problem in existing central offices utilizing conventional switching train or crossbar techniques.

Because of the high community of interest existing among extension users, the private branch exchange appears to be a particularly attractive area in which to explore the application of common equipment methods to reduce customer dialing effort. It is to be anticipated that in addition to cutting down the number of digits associated with calling a particular telephone number, the elimination of the need to dial the directing digit "9" and the need to wait for a second dial tone that is usually associated with this procedure would be considered advantageous by PBX customers. A workable scheme should involve the installation at the private branch exchange of simple, easily serviced, and inexpensive equipment, and should be compatible with outgoing trunk circuits. Such equipment as may be required at the central office to cooperate with the foregoing should be available for use with the corresponding equipments at a number of remote private branch exchanges in such a manner that neither the concept of common control, which characterizes central office installations, nor the concept of intercommunication, which characterizes PBX switching installations, will in any way be jeopardized.

Accordingly, it is an object of the present invention to provide a simple and inexpensive arrangement for permitting extension users to employ abbreviated or condensed dialing of frequently called telephone numbers.

It is another object of the present invention to provide a translator whose repertory of telephone numbers may easily be altered and which may function on a common equipment basis.

It is another object of the present invention to eliminate the need for dialing an initial directing digit, such as the digit "9," on at least some outgoing calls.

It is another object of the present invention to eliminate the need for an extension user to await "second dial tone" on at least some outgoing calls.

The foregoing and other objects are achieved in accordance with the principles of the present invention, in one illustrative embodiment, by including a plurality of auxiliary trunks on at least one otherwise unassigned level of the first selector of a private branch exchange switching system, the level on the selector corresponding to the first digit of a condensed dialing code. Each such auxiliary trunk is associated with a corresponding trunk on the selector's level of outgoing trunks, for example by multipled sleeve terminals, so that an auxiliary trunk can be seized by the selector only when its corresponding outgoing trunk is idle. The second and third digits of the condensed dialing code are transmitted over the selected idle auxiliary trunk to a connector type switch which selects a terminal on its bank having coordinates corresponding to the transmitted second and third digits. A pair of row and column relays are activated in accordance with the selected terminal's coordinates and contacts of these relays control a multi-frequency outpulser which transmits the digits of the condensed dialing code to the central office over a data link individual to the PBX. At the central office, the data links, from the various PBX's having condensed dialing service, each terminate in a respective line circuit. The line circuit seizes an available receiver through a receiver-sending link. The digits outpulsed by the PBX are entered in the receiver and enable the receiver respectively to select a crossbar switch, to operate its horizontal select and vertical hold magnets, and to select a contact of its operated crosspoint. The selected contact is associated with a code point from which a jumper threads a "word-organized" array of transformer cores in accordance with the conventional telephone directory number digits corresponding to the condensed dialing code. The auxiliary trunk at the private branch exchange has in the meantime applied a calling bridge to its associated outgoing trunk to place it in the "dial tone" state. This state having been obtained, the telephone directory number digits corresponding to the condensed dialing code are transmitted back over the data link to the private branch exchange and applied by the auxiliary trunk to the associated outgoing trunk, thereby to operate the outward switching network of the central office in the conventional manner. At the completion of outpulsing of the directory number digits, the auxiliary trunk cuts through a communications connection to directly connect the tip and ring associated with the auxiliary trunk appearance on the condensed dialing level of the first selector with the tip and ring of the associated outgoing trunk on the selector's level of outgoing trunks.

Accordingly, a feature of the present invention is an auxiliary trunk circuit which receives condensed codes transmitted by a PBX station, obtains the conventional telephone numbers corresponding thereto, and provides for the transmission of these numbers to the central office over the outgoing trunks with which the PBX is normally equipped.

Another feature of the present invention is a data link and translator accessible to the auxiliary and outgoing trunk circuits so that the condensed codes are transmitted from the auxiliary trunk over the data link to the translator and the corresponding telephone numbers are transmitted from the translator back over the data link to one of the outgoing trunks.

Another feature of the present invention is an auxiliary trunk circuit for seizing and placing in the "dial tone" state an idle "ninth level" trunk circuit during the dialing of a condensed dialing code which code need not include the digit "9."

According to a further aspect of the foregoing feature, the auxiliary trunk circuit obtains an expanded code corresponding to the condensed dialing code and transmits the expanded code to the central office over the seized ninth level trunk.

Another feature of the present invention is a circuit for selecting auxiliary trunks with one digit of the condensed dialing code and recombining that digit with the remaining digits of the dialed code to increase the number of nonconflicting codes that can be composed from these remaining digits.

A further feature of the present invention is a crossbar translator circuit in which a multicontact crosspoint is selected and one contact of the selected crosspoint energized in accordance with a condensed dialing code.

Still another feature of the present invention is a first circuit for associating outgoing and auxiliary trunks on different levels of the first selector of an outward switching train so that each reflects the busy and idle states of the other, and a second circuit which directly interconnects the different level appearances of these trunks after the completion of signaling thereover.

The foregoing and other obects and features may become more apparent by referring now to the drawing in which:

FIGS. 3 and 4 show that portion of the circuitry which advantageously may be located at the remote central office; and in which

Figure 1:
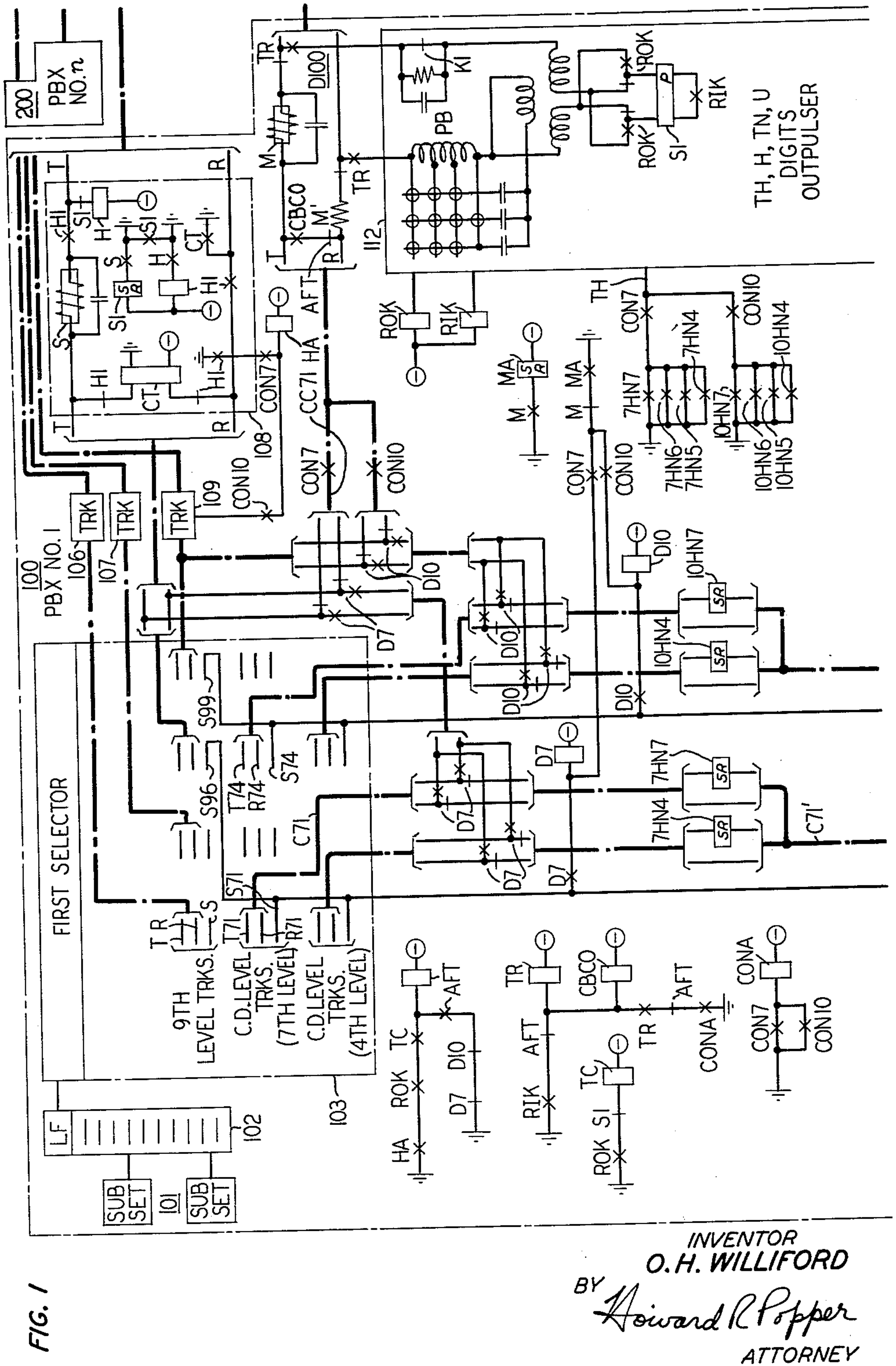
FIGS. 1 and 2 show that portion of the circuitry of the present invention that is located at each PBX.

The private branch exchanges 100, 200 (FIG. 1) are assumed, for the sake of illustration, to be of the conventional step-by-step type. Each such PBX includes a plurality of extension stations 101, each of which is assigned an extension number having, for example, a four-digit designation. When an extension user at the PBX desires to initiate a call he releases the subset switchhook and awaits dial tone. A line finder 102, associated with an idle selector 103, locates the line terminals of the calling subset and applies dial tone furnished by the selector. In response to dial tone the extension user proceeds to dial the called number. The wipers (not shown) of the first selector 103 are stepped by the first dialed digit to a correspondingly numbered level of terminals on the selector's terminal bank. Before the second digit is dialed the first selector causes its wipers to hunt across the level and to seize an idle set of the terminals appearing on that level.

In most conventional PBX switching systems, the terminals appearing on the various levels of the first selector are terminals of trunks, that is, they are not directly associated on a one-for-one basis with particular extensions in the PBX because there are more extensions in the average PBX than can be given direct appearances on the bank of a first selector. Additional selector and connector stages, not shown, are required and these are conventionally operated by the second and succeeding digits dialed by the calling extension user.

Conventions have grown up regarding the assignment of trunks to the levels of the first selector. In accordance with one such convention, terminals of the tenth level are assigned to local switchboard operator or local "attendant" trunks, terminals of the ninth level are assigned to outgoing or central office trunks (such as trunks 106, 107, 108, 109) and terminals of levels 1 through 8 are assigned either to local completing (intra-PBX) or to tie trunks. In most installations there will be at least one and usually two or three of levels 1 through 8 which are unassigned. Let it be assumed in the following description that levels 4 through 7 have not been assigned a conventional PBX usage.

Figure 3:
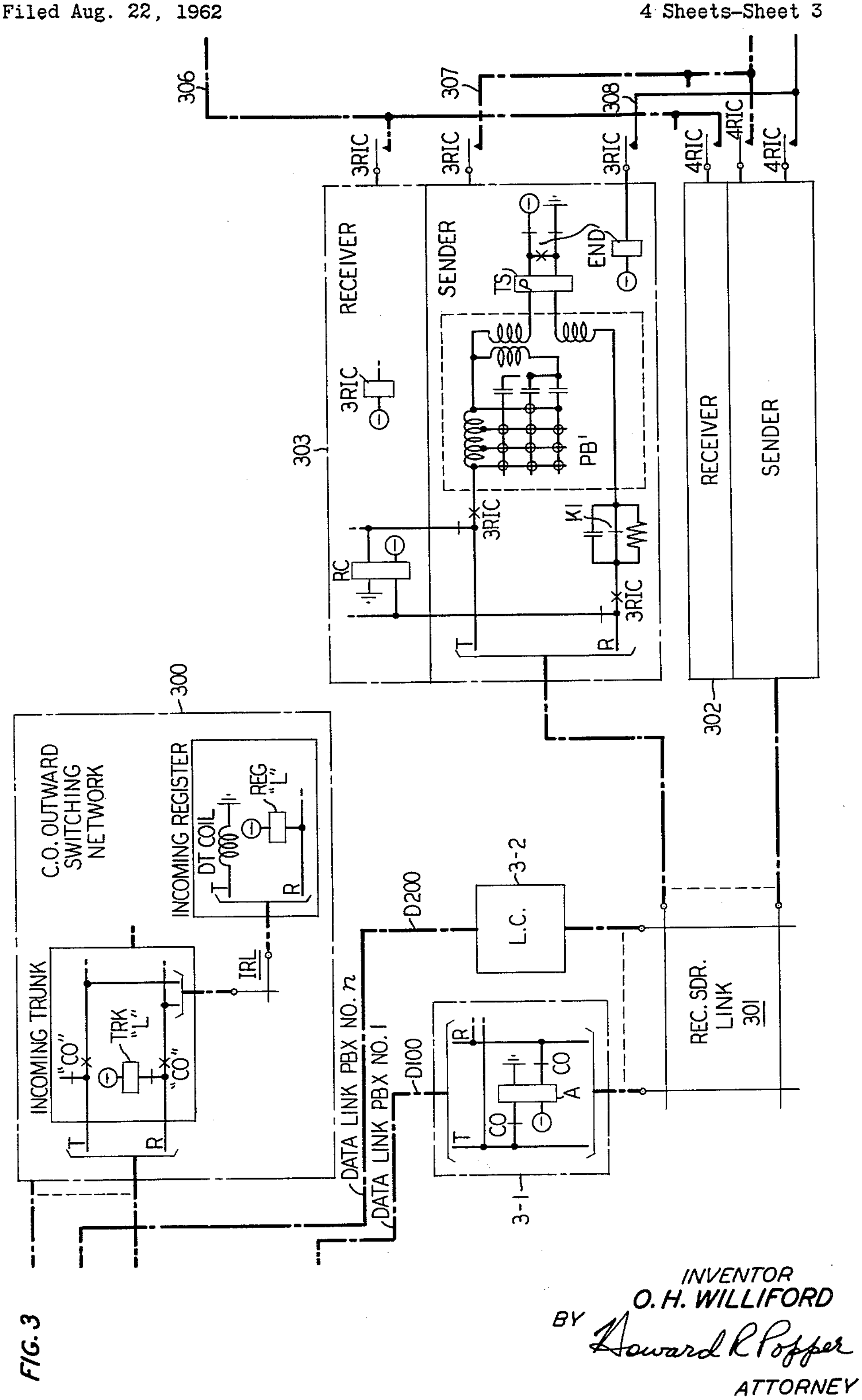

However, in accordance with conventional PBX operation, when the extension user, after receiving the dial tone furnished by the first selector, dials the directing digit "9," the first selector rises to the ninth level and hunts across the trunks 106, 107, 108, 109, and any other trunks appearing on that level until an idle one is found. The seized trunk has its tip and ring bridged by the calling extension station and this bridged condition constitutes a service request to the central office outward switching network 300 (FIG. 3). In response thereto, a second dial tone is furnished the extension user, this time by the central office network 300, and thereafter the extension user may proceed to dial the seven, ten or thirteen digits of any telephone number assigned in the nationwide dialing system.

While the dialing of seven-digit and ten-digit telephone numbers is not unduly burdensome when calls are made on an occasional basis, studies have shown that the repeated dialing of the same lengthy series of numbers, rather than "educating" or increasing the proficiency of the dialer, results on the contrary in an increase in dialing errors. Whatever the underlying reasons for this may be, it is evident that dialing errors will be materially reduced if the length of such repeatedly dialed numbers is reduced. The present invention is directed to a circuit which enables the user of PBX extensions to place calls through the outward switching network 300 of conventional central offices without waiting for the return of second dial tone and by dialing fewer digits than are normally required to be dialed to operate the switching network 300. It is considered that this feature will improve that area of telephone service that is most susceptible to dialing errors because of high level traffic.

At this point it may be well to consider the characteristics of the condensed code to be employed. Each business organization which generates sufficient telephone traffic to warrant the installation of a private branch exchange will normally be found to make calls to a particular group of telephone numbers on a sufficiently repetitive basis to warrant these numbers being treated specially. The average size business organization served by a private branch exchange system in which the extension stations are assigned four-digit designations may have about fifty such frequently called numbers and it is these numbers that will form the repertory of numbers for which condensed dialing codes should be assigned. Although a repertory of fifty, or even one hundred condensed dialing codes, could be designated by the use of merely a two decimal digit condensed dialing code, a three-digit code is preferred for this purpose because it allows for simplification of the translator that is to be used in common by each of the different PBX's, as will hereinafter be more fully explained.

Let it be assumed that the extension user at subset 101 desires to place a call to a supplier who is called on a sufficiently repetitive basis to warrant his being assigned a three-digit condensed dialing code, such as mode 762. The extension user removes the receiver from the switchhook of subset 101 and receives normal dial tone over circuits (not shown) that are customarily associated with the line finder 102 and the first selector 103 of his private branch exchange switching system 100. The extension user dials the first or hundreds digit of the condensed dial code which digit is assumed to be "7." In response to the dialing of digit "7," the first selector steps its wiper (not shown) in the normal manner to the seventh level of terminals on its terminal bank. The first selector 103 then in the normal manner steps across the terminals on the seventh level, examining the sleeves until it finds one that is not grounded indicating that the corresponding trunk is idle. The selector stops its wiper opposite the terminals of the idle trunk and makes the trunk busy by applying ground to the sleeve terminal.

Each trunk on the seventh level of the first selector has its sleeve terminals such as sleeve terminals S71 and S74 of the first and fourth position trunks, connected to the sleeve terminal of a respective trunk on the ninth level of the selector. Advantageously, the trunks appearing in the first through fifth positions on the ninth level are allowed to perform their usual functions while those in the sixth through ninth positions may be chosen as those whose sleeve terminals S96 through S99 will be connected to the sleeves S71 through S74 of the seventh level trunks.

In this manner dial "9" calls will normally attempt to select ninth level trunks in the first preferred positions while compressed dialing calls will test those ninth level trunks appearing in subordinately-preferred positions that are not normally selected for use by dial "9" calls. The system thereby retains flexibility in that conventional or noncompressed code dialing calls may continue to be made in the usual manner even over trunks selectable from the condensed dialing levels of the first selector.

Figures 2, 5:
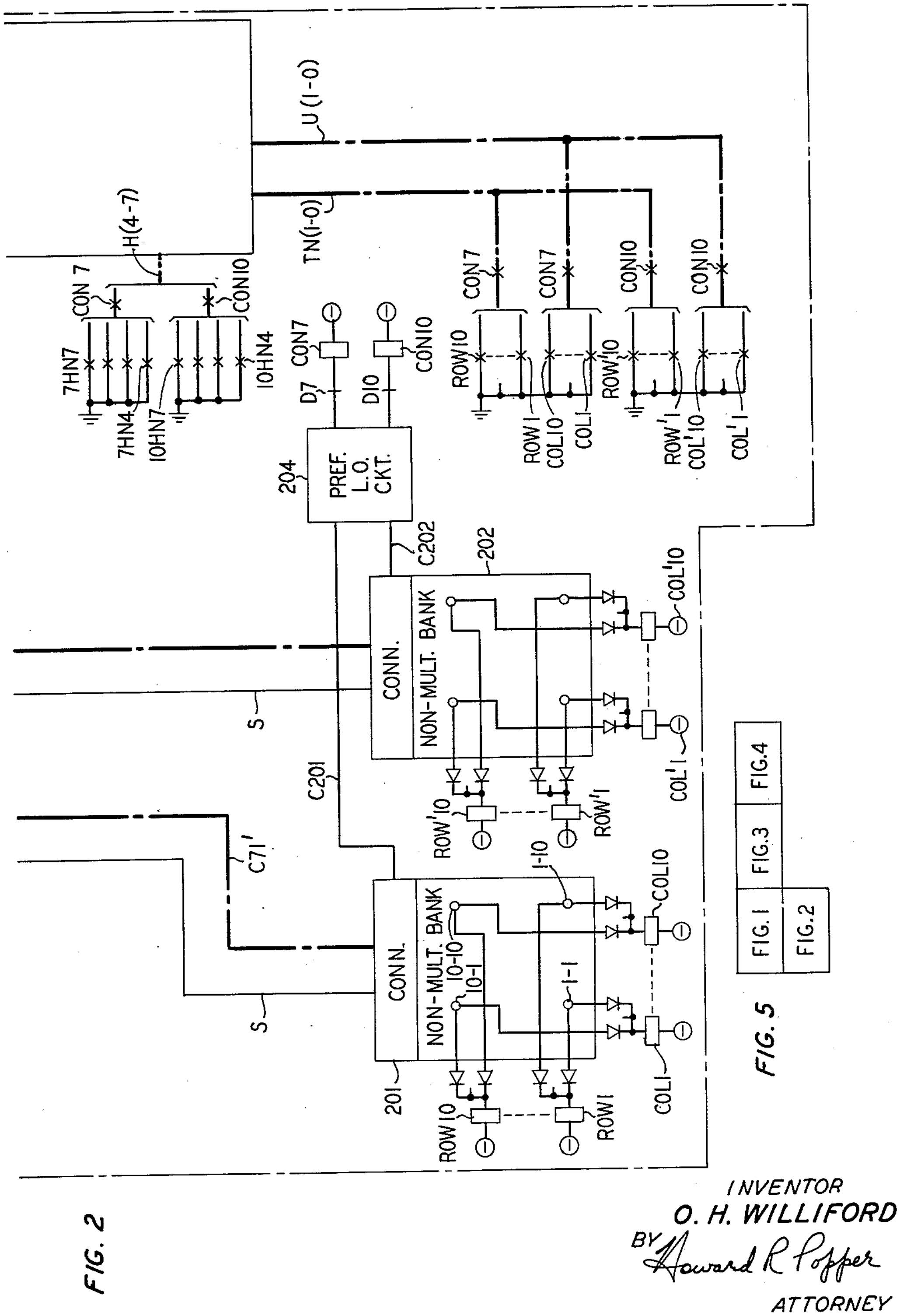
FIG. 5 shows how FIGS. 1 through 4 shall be assembled.

Let it be assumed that, in the condensed dialing code call being made, the first trunk on the seventh level of selector 103 is selected because its sleeve and the sleeve S96 of ninth level trunk 108 reflect an idle condition. Selector 103 in the usual manner then applies a ground to sleeve S71 which ground is continued over to sleeve S96 to prevent trunk 108 from being seized at its multiple appearance on any of the other first selectors (not shown) normally used. Subset 101 presents a calling bridge to the tip and ring terminals T71, R71. The calling bridge condition is continued over the back contacts of relay D7 in cable C71, and the winding of relay 7HN7 to cable C71' and connector 201 in FIG. 2.

Connector 201 may advantageously be any of the well-known types of step-by-step switches which advances its wipers up to a level on its terminal bank under the direction of one sequence of dial pulses and which rotates its wipers along the level under the direction of a subsequent sequence of dial pulses. In accordance with the mode of operation envisioned herein, the dial pulses associated with the second digit of the compressed dialing code dialed by the extension user step the wipers (not shown) of connector 201. Assuming the condensed dialing code is 762, the wipers of connector 201 will be stepped to the sixth level of terminals on the connector bank. The third digit of the compressed dialing code steps the wipers of connector 201 along the selected level. In the assumed compressed dialing code the wipers will make contact with the second set of terminals on the sixth level of the connector bank. For the sake of simplicity, however, only four terminals are explicitly shown on the bank of connector 201 and these are the first and last terminals of the first and last row and column of terminals on the connector bank. In a conventional connector there are ten levels or rows and ten rotary positions or columns of terminals. The terminals on the bank of connector 201 are numbered in accordance with the sequence of dial pulses required to step the wipers of the connector to each of the terminals. Thus, the first terminal on the lowest level of the bank is terminal 1–1 and the last terminal on the lowest level is terminal 1–10, whereas the first terminal on the highest row of the connector bank is terminal 10–1 and the last terminal on the highest bank is terminal 10–10.

When the second and third digits of the compressed dialing code have stepped the wipers of connector 201 to a particular terminal on its terminal bank, one of the row relays ROW1 through ROW10 and one of the column relays COL1 through COL10 will be operated by the ground supplied to the selector terminal by the wiper of connector 201. Advantageously, the particular wiper of connector 201 that is used to apply the ground may be the sleeve wiper (not shown). Similar row relays ROW'1 through ROW'10 and similar column relays COL'1 through COL'10 are associated with connector 202.

Contacts of relays ROW1 through ROW10 are associated with respective ones of the ten TN(1–0) buses and contacts of relays COL1 through COL10 are associated with respective ones of the ten U(1–0) buses. The hundreds digit was previously registered on one of the H(4–7) buses by the operation of the hundreds digit regenerating relay incident to the operation of connector 201. In the above example, the operation of relay 7HN7 at one of its make contacts grounded bus H7. Another make contact of relay 7HN7 grounded the TH bus. In the above example, when connector 201 positions the wipers opposite the second terminal on the sixth row, row relay ROW6 and column relay COL2, though not explicitly shown in the drawing, would be operated and their make contacts would ground the TN6 and the U2 buses.

When connector 201 has stopped at the above-mentioned second terminal on the sixth row, a "C" relay (not shown) is released in the connector. The release of the "C" relay at the completion of rotary stepping is a well-known function of connector circuits, and accordingly the circuits therefor need not be shown in detail. A spare contact on this relay is associated with lead C201 to ground this lead when connector 201 has completed rotary stepping. Lead C201 grounded activates preference lock-out circuit 204 so that the ground applied to lead C201 may be extended over back contact D7 to operate connector relay CON7, provided that no other connector, such as connector 202, has grounded its corresponding lead C202. As many connectors 201, 202, et cetera, may be provided as there are subordinately positioned outgoing trunks such as 108, 109. Preference lock-out circuit 204 advantageously may comprise any of the types of such circuits well known in the art, some of which are described, for example, in the book entitled "The Design of Switching Circuits" by Keister, Ritchie and Washburn, published by D. Van Nostrand Company, 1951.

The connector contacts of connector relay CON7 connect the TH, H, TN, and U digit buses to outpulser 112 and one of its make contacts completes one of the possible operating path for relay CONA which in turn operates. Another make contact of relay CON7 prepares an operating path for relay D7 but relay D7 does not operate at this time.

The three-digit code dialed by the extension user, plus the fourth or TH digit added by the contacts of the hundreds digit regenerating relay 7HN7, are entered in outpulser 112 by the digit buses over connector contacts CON7. The registration of these four digits is verified in outpulser 112 in the conventional manner by the operation of a read-in check relay, such as relay RIK (FIG. 1). Details of circuitry for registering digits and for operating a read-in check relay are omitted in view of their conventional nature. Relay RIK operated, at one of its make contacts, completes an operating path to the windings of relays TR and CBCO. Another make contact of relay RIK bridges the windings of outpulser 112 supervisory relay S1.

Relay TR operated connects data link D100 to the output of outpulser 112. Relay TR operated locks itself and relay CBCO to ground in series with a back contact of relay AFT and a make contact of relay CONA. Relay CBCO operated at its make contact applies a calling bridge including a back contact of relay AFT across the tip and ring conductors of the left-hand side of data link D100. The left-hand side of data link D100 is at this time isolated from outpulser 112 by the operated back contacts of relay TR. The tip and ring leads from the calling bridge at the left-hand side of data link D100 are continued over make contacts of connector CON7, cable CC71, and back contacts of relay D7 to the tip and ring conductors of trunk 108. Application of this calling bridge to the tip and ring leads causes trunk 108 to place the central office outward switching network 300 in the dial tone state. In FIG. 3 an illustrative portion (i.e., a typical incoming trunk, incoming register, and incoming register link IRL) of the outward switching network 300 is shown schematically. When the calling bridge including make contact CBCO and back contact AFT (FIG. 1) is initially applied between the tip and ring leads of trunk 108, relay CT in trunk 108 is operated in series with back contacts of relay H1. Relay CT operated at its make contact applies ground to the ring lead of trunk 108 on the central office side of cut-through contact H1. This ground operates the trunk "L" relay at the central office 300. Work contacts (not shown) of the trunk "L" relay operate the incoming register link IRL to assign an idle incoming register to the trunk. The assigned incoming register of central office 300 returns ground in series with the dial tone coil to the tip conductor. Relay H of trunk 108 operates in response to the ground applied by the assigned register and operates relay HA in series with an operated make contact of connector CON7. The operation of relay HA therefore signifies that the central office originating switching network 300 has been placed in the dial tone state. However, this dial tone is not audible to the extension user and does not in any way delay his dialing of the three-digit condensed dialing code. Relay HA operated prepares an operating path to the winding of relay AFT.

Relay H operated operates relay H1 which releases relay CT. Relay H operated also cuts through the tip and ring conductors from the central office side of trunk 108 to the "PBX" side of trunk 108. The release of relay CT removes the ground that was formerly applied by a make contact of this relay from the ring conductor but the register "L" relay is not released because its operating path is maintained by the calling bridge. In this regard it is assumed that the make contacts of relay H1 in series with the tip and ring conductors will "make" slightly earlier in time than the H1 back contacts in series with the winding of relay CT "break" so that an inadvertent "open" will not be transmitted to the central office register and prime it to respond to dial pulses instead of the multifrequency signals intended later to be forwarded it. Relay S operates in series with the loop current and in turn operates relay S1 which removes the winding of relay H from the tip conductor for improved transmission. Relay S1 operated also provides a holding ground for relay H1.

The central office switching system 300 will be allowed to remain in the dial tone state until the desired seven, ten, or thirteen digit code corresponding to the abbreviated code dialed by the extension user has been obtained from the circuitry hereinafter to be described. This circuitry, however, operates in such a short time that the dial tone state is actually being obtained at the same time that the translated code is being obtained. Accordingly, the dial tone state is obtained only a very short time before the actual transmission of the translated code to the central office switching system 300 is to commence.

Returning now to the operation of outpulser 112 and data link D100, the bridging of the windings of polar relay S1 by a make contact of relay RIK constitutes a calling bridge condition that is carried forward over make contacts of relay TR to the right-hand portion of data link D100. Data link D100 terminates in a line circuit 3–1 (FIG. 3) and data link D200 of PBX 200 terminates in a corresponding line circuit 3–2. The line circuits for each PBX data link have a respective appearance in receiver-sender link 301. These line circuits as well as link 301 may advantageously be of any well-known type. The battery and ground returned by the "A" relay of line circuit 3–1 does not operate polar relay S1. However, when receiver-sender link 301 connects an idle receiver-sender set such as 303, the receiver supervisory relay RC returns battery and ground that is of the proper polarity to operate outpulser supervisory relay S1.

Relay S1 operated at its work contacts (not shown) enables outpulser 112 to transmit the TH, H, TN, and U digits over data link D100 to the receiver portion of the assigned receiver-sender set 303. Advantageously, outpulser 112 may include a multifrequency generator operable in series with the loop current, as described in the article entitled "Tone Ringing and Pushbutton Calling" by L. A. Meacham in the Bell System Technical Journal, March 1958, pp. 339–360. However, instead of the contacts of the frequency selecting "pushbutton" array PB being manually operated, they advantageously may be operated in sequence by the registering relays (not shown) that are associated with the TH, H, TN, and U digit buses. At the completion of outpulsing, outpulser 112 read-out check relay ROK is operated in the usual manner. Relay ROK is advantageously made slow operate relative to the operating time of read-in check relay 3RIC at the receiver-sender set 303.

Relay 3RIC operated signifies that the receiver portion of receiver-sender set 303 has received four digits, at which time its operation transfers the tip and ring leads extended through link 301 to the sender portion of receiver-sender set 303. In addition to its transfer contacts, relay 3RIC controls connector contacts, similarly designated, to connect the output of the receiver portion of receiver-sender 303 to cable 306 and the input of the transmitter portion to cable 307 and to lead 308. Cables 306 and 307 and lead 308 are associated with the apparatus for translating the condensed dialing codes into conventional telephone directory numbers shown in FIG. 4, which apparatus will be hereinafter more fully described.

Returning now to FIG. 1, outpulser 112 read-out check relay ROK operated reverses the connections to the winding of polar supervisory relay S1. Polar supervisory relay S1 is now released because the battery and ground potentials applied over the winding of marginal polar supervisory relay TS in the sender portion of receiver-sender set 303 are opposite to that formerly provided by the winding of receiver supervisory relay RC. Relay ROK operated and relay S1 released complete an operating path to relay TC which operates, signifying that the translator transmitter, i.e., the sender portion of receiver-sender 303, has been connected. Relay TC operated at one of its make contacts completes an operating path (made available over operated make contacts of relays HA and ROK) to the winding of relay AFT. Relay AFT now operates and at its back contact removes the calling bridge priorly inserted across the extended tip and ring conductors of trunk 108.

Relay AFT operated also opens the locking path for relays TR and CBCO which release. Relay TR released at its back contacts connects data link D100 to the extended tip and ring conductors of trunk 108. Relay AFT operated locks to ground in series with the back contacts of relays D7 and D10. The central office outward switching network continues to be held in the dial tone state, after the aforementioned calling bridge is removed, by the battery and ground applied over the windings of marginal polar relay TS in the sender portion of receiver-sender set 303. In this connection it should be noted that the battery and ground applied over the windings of relay TS aids the battery and ground polarities respectively applied over the winding of the register "L" relay and the dial tone coil in switching network 300. The combined battery and ground supervision is sufficient to enable marginal polar relay TS in the sender portion of receiver-sender 303 to operate. Relay TS operated at its work contacts (not shown) permits the sender to outpulse over data link D100 the digits of the seven, ten, or thirteen digit code that will be furnished the sender by the translator apparatus in FIG. 4.

When relay TR released, as described above, the windings of series relay M (FIG. 1) were inserted in series with the tip and ring between the data link and the extended conductors of trunk 108. Relay M operates in response to the high current in the loop including the data link and the central office trunk due to the aiding potentials of the battery and ground supervision. Relay M operated, at its make contact operates relay MA and at its back contact opens the operating path to relay D7 that would otherwise be completed by the operation of relay MA, preventing this relay D7 from being operated at this time. When the sender of receiver-sender set 303 has completed outpulsing, the translated code relay END is operated, removing battery and ground supervision from the windings of transmitter supervisory relay TS, and substitutes a holding bridge across these windings. The loop current is thereupon reduced sufficiently to allow series relay M to release. Relay M released at its back contact restores the operating path to the winding of relay D7. Relay D7 operates and locks to sleeve ground before its operating path is broken by the release of slow release relay MA. Relay D7 operated opens the locking path for relay AFT which releases. Relay D7 operated disconnects the extended tip and ring of trunk circuit 108 from data link D100 and connects them directly to the tip and ring terminals T71, R71 of the seventh level condensed dialing trunk selected by the extension user. The data link is thereupon restored to normal and may again be utilized when outpulser 112 is reseized by another extension user having dialed an abbreviated dialing code.

Figure 4:
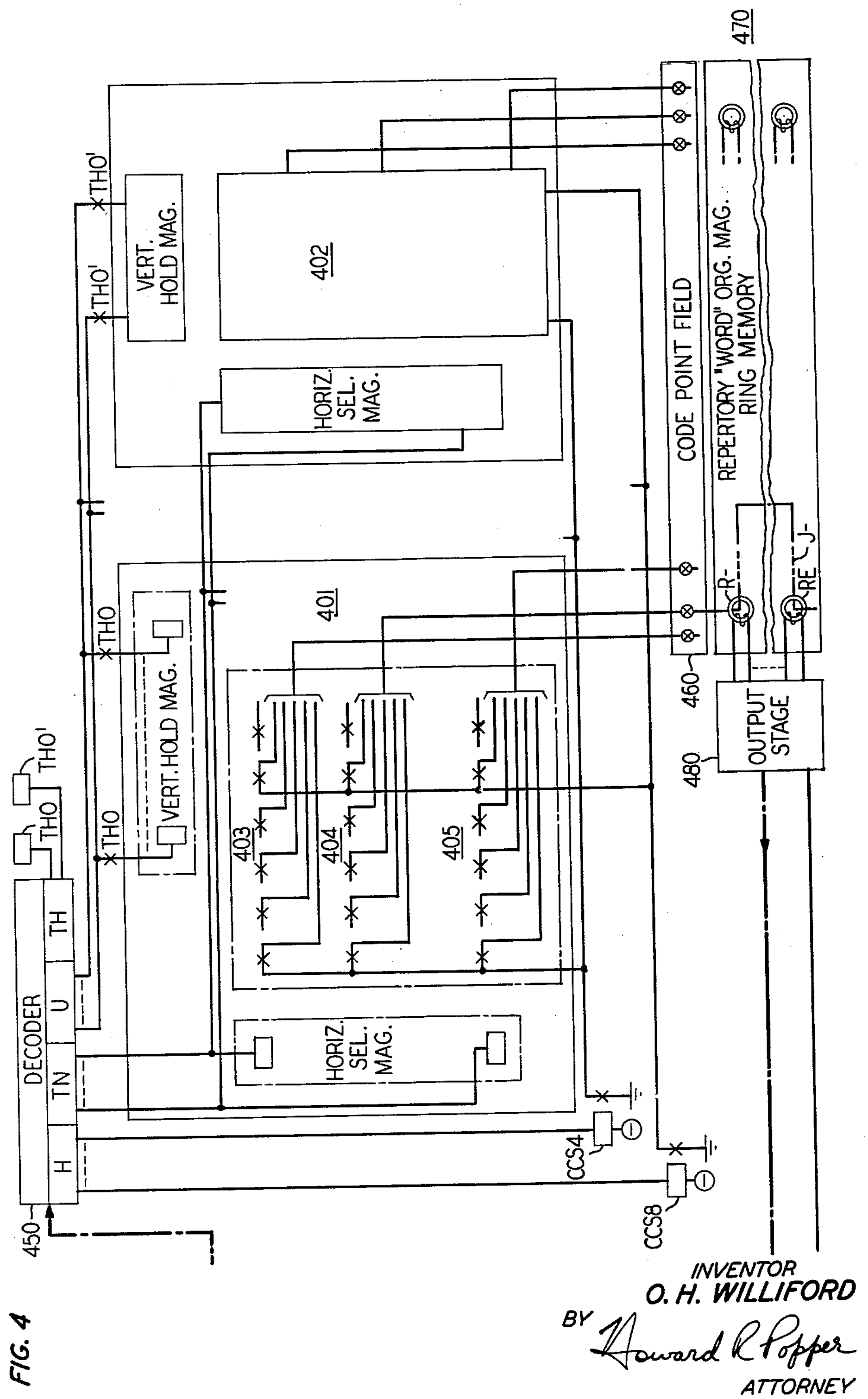

Referring now to FIG. 4, there is shown the translator for responding to the four-digit condensed dialing code obtained by one of receiver-senders 302, 303 (FIG. 3) and for providing to the sender portions thereof the corresponding repertory word, i.e., seven, ten, or thirteen digit telephone number. The illustrated translator comprises two, twenty vertical, six-wire crossbar switches 401, 402, a decoder 450, a code point field 460, an array of magnetic transformer rings 470, and an output stage 480. Additional twenty vertical crossbar switches may be added to increase the number assignment flexibility if desired.

With the use of only two, twenty vertical crossbar switches, forty verticals are available and each of the forty verticals may be assigned to designate the fifty repertory translations for one PBX. If it is thus desired that all the translations for a given PBX should be confined (for ease of maintenance) to the same vertical, it is required that all the condensed dialing codes for the given PBX have the same units digit, for example. Since the units digits 0 through 9 only allow for the selection of ten verticals corresponding to ten different PBX's, the TH digit is used to increase the selection by steering the outputs from the units digit stage of decoder 450 over the additional vertical hold magnets of crossbar switches 401 and 402. To designate forty verticals in this manner four TH digit outputs would be required and there would be four relays in the group of relays TH0 through TH0'.

On the other hand, if it is desired to serve forty different PBX's and not to restrict the fifty condensed dialing codes per PBX in any manner, twenty crossbar switches providing a total of four hundred verticals would be required. Each units digit would require a respective vertical and each PBX would be assigned ten verticals. Since forty TH digits would be required, it would be necessary for outpulser 112 to transmit "two-digit TH" digits on a decimal basis instead of the one decimal digit TH digit previously assumed. Alternatively, outpulser 112 need generate no TH digit at all if each line circuit 3–1, et cetera, (FIG. 3) operates a respective one of forty TH0 through TH0' relays of FIG. 4.

Inasmuch as the restriction of one digit of the condensed dialing codes would not appear unduly to limit the flexibility of the system, the description of the illustrative embodiment will be continued on this basis. If a particular PBX should require more than fifty repertory codes which can be selected using the same units digit, additional units digits each capable of increasing the repertory by fifty condensed dialing codes may be assigned to the PBX.

When one of the receivers such as receiver 303 has been seized by receiver-sender link 301 and has received a four-digit code transmitted to it over a data link from one of the PBX's served by the central office, its read-in check relay 3RIC is operated. The operation of relay 3RIC effects the operation of connector relay contacts 3RIC in the well-known manner. For example, assuming the receiver portion of receiver-sender set 303 to have been seized and to have received a four-digit code from PBX 100, relay 3RIC is operated upon the completion of a conventional read-in check. Relay 3RIC operated at its uppermost connector contacts connects the receiver portion of receiver-sender set 303 to cable 306 and at its next lower contacts connects the sender portion of receiver-sender set 303 to cable 307. In addition, the lowermost of contacts 3RIC connects the winding of relay END to lead 308. When the receiver portion of receiver-sender set 303 is connected to cable 306, the four-digit code is transferred to decoder 450 (FIG. 4). Decoder 450 responds to the TH digit to operate a corresponding one of steering relays TH0 through TH0'.

It will be recalled that the TH digit transmitted to the receiver over the data link was obtained from a contact of one of the hundreds digit regenerating relays 7HN4 through 7HN7 or 10HN4 through 10HN7. The TH digit, in addition to the U digit, is used by the translating equipment in identifying the particular vertical of crossbar switches 401, 402 having the repertory of telephone numbers for each PBX. Contacts of steering relays TH0 through TH0' selectively connect the units digit outputs of decoder 450 to different groups of the vertical hold magnets associated with crossbar switches 401 and 402 and the combination of the operated TH0 through TH0' relays and the activated units digit output uniquely identify a vertical hold magnet. The ten TN digit outputs of decoder 450 are connected to the ten horizontal select magnets of crossbar switches 401 and 402.

The fifty numbers that form the condensed code repertory for a given PBX all end in the same units digit. These condensed code numbers may have hundreds digits chosen from the numbers 4 through 8 and tens digits chosen from the numbers 0 through 9. Accordingly, the fifty abbreviated dialing codes for the first PBX will be 401, 411, 421, 431, 441, 451, 461, 471, 481, and 491; 501, et cetera, through 591; 601, et cetera, through 691; 701, et cetera, through 791; and 801, et cetera, through 891.

The hundreds digit outputs of decoder 450 are connected to crosspoint contact selection relays CCS4 through CCS8. It will be recalled that there will be as many hundreds digits as there are levels of the first selector 103 set aside for condensed dialing codes. Inasmuch as the third through the eighth levels of first selector 103 conventionally may be unassigned, enough crosspoint contact selection relays CCS4 through CCS8 are shown to handle all these possible hundreds digit condensed code designations even though, in FIG. 1, only levels four through seven were illustrated.

Crossbar switches 401, 402 include a plurality of crosspoints of which only the crosspoints 403, 404, and 405 are shown. Each crosspoint includes six contacts which are operated when the crosspoint is "made." A crosspoint is made or operated when its corresponding horizontal select and vertical hold magnets are energized. Crosspoint 403 may be assumed to be controlled by the operation of the uppermost horizontal select and the leftmost vertical hold magnets of crossbar switch 401. Crosspoints 404 and 405 may be assumed to be controlled by the same vertical hold magnet and by an intermediate and the lowermost ones, respectively, of the horizontal select magnets. The crossbar switches are wired so that in each vertical column of crosspoints the first contacts are wired together to a circuit controlled by crosspoint contact selection switch CCS4 and the last contact of each crosspoint in the column is controlled by crosspoint contact selection switch CCS8. Intermediate contacts of each crosspoint in a column are controlled by respective intermediate crosspoint contact selection switches not shown.

When a vertical and horizontal magnet of crossbar switch 401 are operated by the particular tens and units digit entered in decoder 450, the six contacts of the corresponding crosspoint are closed. The operation of one of the crosspoint contact selection switches applies ground however only to one of the six closed contacts of the selected crosspoint. The other side of each crosspoint contact is connected to an individual code point in code point field 460 so that the entry of a four-digit number in decoder 450 results in the application of ground to only one of the code points in the field. Each code point in field 460 for which a telephone number is assigned will have a jumper J– connected thereto and this jumper threads the transformer rings R– in memory 470 in a pattern that corresponds to the digits of the required telephone number. Each jumper J– therefore defines digits in a seven, ten, or thirteen digit word and, accordingly, memory 470 is a word-organized memory. As described in Patent 2,614,176, issued to T. L. Dimond on October 14, 1952, the grounding of a jumper threading a plurality of transformer rings causes a pulsing circuit (not shown) associated with the memory to apply a current pulse to the jumper. The current pulse induces an output voltage in the windings associated with the threaded transformer rings. The output windings are applied to an output stage 480 which advantageously may include a plurality of gas tubes for registering and serially transmitting the digits of the output word indicated by the energized jumper. The output stage 480 is connected to the sender portion of receiver-sender set 303 over cable 307 and lead 308. Signals are passed along cable 307 to operate the frequency selecting contacts of the "pushbutton" array PB′ of the multifrequency sender portion of receiver-sender 303 in similar fashion to that in which signals were passed to operate the corresponding contacts PB of outpulser 112. When the seventh, tenth, or thirteenth digit has been transferred from output stage 480 to operate the appropriate contacts PB′ of sender 303, an end-of-pulsing signal is applied by output stage 480 to lead 308 to operate relay END in the sender. This end-of-pulsing signal advantageously may be provided to output stage 480 by threading jumper J– through a transformer ring RE in array 470 assigned for this purpose. Accordingly, when output stage 480 responds to the indication furnished by this core, it applies a ground to lead 308.

Accordingly, it is seen that a three-digit code dialed by a PBX extension user results in the selection of an auxiliary trunk at the PBX that is associated with an idle central office trunk. The auxiliary trunk provides for the registration of the remaining digits and the regeneration of the initial digit of the condensed dialing code. The digits of the condensed dialing code are transmitted to a common translator serving a plurality of different PBX's which translator includes a plurality of crossbar switches. The crossbar switches may be wired to provide a variety of different translations for the condensed dialing codes for each PBX and the codes may be restricted for use by individual PBX's or usable by all PBX's in common, as desired. The condensed dialing code translated by the translator into a conventional seven, ten, or thirteen digit telephone number code is transmitted back along the same path to the PBX over which the condensed dialing code was furnished and is applied at the PBX to the idle central office trunk associated with the auxiliary condensed dialing trunk. After the completion of this transmission, the outgoing central office trunk is cut through to the extension user, thereby establishing the normal communications path.

It is understood that the above-described arrangements are merely illustrative of the application of the principles of the invention. Numerous other arrangements may be devised by those skilled in the art without departing from the spirit and scope of this invention.

What is claimed is:

1. A telephone switching system including a central office and at least one private branch exchange served by said central office, a plurality of outgoing trunks connecting said private branch exchange to said central office, means for obtaining the directory numbers of telephones served by said central office, and means for transmitting the directory numbers of said telephones served by said central office over said trunks outgoing from said private branch exchange, said last-mentioned means comprising a data link interconnecting said private branch exchange with said central office, means for transmitting one of said telephone directory numbers from said central office over said data link to said private branch exchange, and means associated with said data link at said private branch exchange for forwarding said directory number to said central office over one of said outgoing trunks.

2. A telephone switching system including a private branch exchange, a central office switching network and trunks outgoing from said exchange to said switching network, said outgoing trunks normally being operable to control said switching network in accordance with numbers following a preliminary number dialed by an extension user at said private branch exchange, said switching system being characterized by means for seizing one of said outgoing trunks to operate said central office switching network incident to the dialing of a number other than said preliminary number comprising means at said private branch exchange for registering a condensed dialing code, said registering means including a plurality of control paths individual to said outgoing trunks, means responsive to the registration of said condensed dialing code for seizing one of said control paths, circuit means providing extended appearances for said outgoing trunks, means for bridging an extended appearance of one of said outgoing trunks, means for translating said condensed dialing code into a conventional telephone directory number code, and means associated with said translating means for transmitting said telephone directory number code over said extended appearance of said outgoing trunk.

3. A private branch exchange trunk circuit comprising a first selector switch, a plurality of outgoing central office trunks, a plurality of auxiliary trunks, said outgoing and said auxiliary trunks being associated with said selector switch, translator means associated with said auxiliary trunks, said translator means having stored therein a plurality of addressed directory numbers, means for reflecting at said auxiliary trunks the busy and idle condition of predetermined ones of said outgoing trunks, means responsive to the dialing of a first address digit for selecting an idle one of said auxiliary trunks, means responsive to the dialing of additional address digits over one of said auxiliary trunks for seizing one of said predetermined outgoing central office trunks, and means for transmitting over said seized trunk the directory number corresponding to said first and said additional address digits.

4. In a telephone switching system having a first selector for connecting an extension station to any of a plurality of trunks in accordance with a first digit signaled by said station, the combination comprising means associated with a trunk selected by said first digit signaled for applying a calling condition to another of said plurality of trunks, a translator, a data link connectable to said translator, means including said data link for coupling subsequent digits signaled by said extension station over said selected trunk to said translator, and means for transmitting digits from said translator over said data link to said trunk having said calling condition applied thereto.

5. A private branch exchange system having an outward switching train including a first selector and a group of outgoing trunks appearing on at least one level of said selector, said trunks normally being selectable by dialing a directing digit associated with said one level, a plurality of auxiliary trunks appearing on at least one other level of said first selector, sleeve circuit means associating subordinately-preferred ones of said outgoing trunks with predetermined ones of said auxiliary trunks, connector circuit means associated with said auxiliary trunks, said connector circuit being operable to select a terminal on its bank having coordinates determined by two successive digits of a condensed dialing code transmitted over said auxiliary trunk, circuit means extending said sleeve circuit to said connector, means for transmitting an expanded code corresponding to said condensed dialing code over one of said subordinately-preferred outgoing trunks associated with said auixilary trunk, means responsive to the completion of said last-mentioned transmission for interconnecting directly said last-mentioned outgoing and said auxiliary trunks, and means for locking said interconnecting means under the control of said sleeve circuit.

6. A telephone system including a private branch exchange and a telephone central office having an outward switching network accessible to said private branch exchange over a plurality of trunks, means for transmitting telephone number codes over said trunks from said private branch exchange to operate said outward switching network at said central office, said last-mentioned means including means for registering a condensed form of said telephone number codes dialed by an extension user at said private branch exchange, means for preparing one of said trunks incident to the dialing of said condensed code, means for transmitting a translated form of said condensed code over said selected one of said trunks, and means responsive to the completion of said code transmitting for establishing a communications switching path from said extension user to said outward switching network over said selected one of said trunks.

7. In a step-by-step switching system, a first selector circuit comprising a plurality of trunks distributed over an outgoing level of said selector, each of said trunks having tip, ring, and sleeve appearances on said selector, a plurality of condensed dialing trunks distributed over at least two other levels of said selector, a plurality of connector circuits equal to the number of said condensed dialing trunks distributed over one of said other levels of said selector, a sleeve circuit connecting each of said connectors to a sleeve terminal of one condensed dialing trunk on each of said other levels and to one trunk on said outgoing level of said selector, a digit transmission circuit, a signal path including one of said connector circuits for connecting the tip and ring of said one condensed dialing trunk to said digit transmission circuit to receive the second and third digits of a condensed dialing code, a digit translating circuit coupled to said transmission circuit and responsive to said first, second, and third digits of said condensed dialing code for applying signals to said tip and ring terminals of one of said corresponding outgoing trunks, and means including said transmission circuit responsive to said translating means for connecting said last-mentioned tip and ring terminals to the tip and ring terminals of said one of said condensed dialing trunks.

8. A private branch exchange system having an outward switching train including a first selector and a group of outgoing trunks appearing on at least one level of said selector, said trunks normally being selectable only by dialing a directing digit associated with said one level, a plurality of auxiliary trunks appearing on at least one other level of said first selector, sleeve circuit means associating subordinately-preferred ones of said outgoing trunks with predetermined ones of said auxiliary trunks, connector circuit means associated with said auxiliary trunks, said connector circuit being operable to select a terminal on its bank having coordinates determined by two successive digits of a condensed dialing code transmitted over said auxiliary trunk, a crossbar switch having a plurality of multicontact crosspoints, transmission circuit means responsive to the coordinate position of said terminal of said connector for operating a corresponding one of said crosspoints of said crossbar switch, means responsive to the selection of one of said auxiliary trunks for energizing a corresponding contact set of said crosspoints, and means including said transmission circuit means activated by the energization of said last-mentioned contact set of said operated crosspoints for applying an expanded code corresponding to said condensed dialing code over one of said outgoing trunks.

9. An abbreviated-dialing code translator for a private branch exchange having a plurality of extension stations, trunks, and a first selector for connecting an extension station to a trunk indicated by a first code digit, said translator comprising a connector associated with predetermined ones of said trunks for selecting a terminal having coordinates coresponding to second and third code digits, decoder means, means responsive to the selection of one of said predetermined trunks for registering said first code digit in said decoder means, coordinate signaling means responsive to the selection of said connector terminal for registering said second and third digits in said decoder means, a crossbar switch having a plurality of multicontact crosspoints, said decoder being connected to operate a crosspoint of said crossbar switch in accordance with a particular combination of said second and third digits, and means connected to said decoder for energizing a contact of said operated crosspoint in accordance with said first code digit.

10. A telephone system including a central office and a private branch exchange associated therewith by a plurality of trunk lines, a plurality of condensed dialing trunks, means responsive to the dialing of an abbreviated code at said private branch exchange for seizing one of said condensed dialing trunks, means for preparing said central office to receive digits over one of said first-mentioned trunk lines, means for transmitting said abbreviated-dialing codes over said condensed dialing trunks to said central office, translating means at said central office for expanding said abbreviated-dialing codes into telephone number codes of the type suitable for transmission over conventional telephone system trunk circuits, and means including said condensed dialing trunks for transmitting said telephone number codes to said central office over said one of said first-mentioned trunk lines.

11. In a telephone system having a private branch exchange of the step-by-step type, an auxiliary trunk circuit, said trunk circuit having an appearance on a level of a first selector switch corresponding to the first digit of an abbreviated-dialing code, a plurality of trunks outgoing to a central office appearing on another level of said first selector, means responsive to the selection of a trunk on said condensed dialing trunk level of said first selector for seizing control of an associated one of said outgoing central office trunks, translator means responsive to the dialing of said abbreviated-dialing code for providing a telephone number code transmissible over said outgoing central office trunk, and means responsive to the receipt of said telephone number code by said central office for establishing a direct transmission path from said outgoing central office trunk to said auxiliary trunk circuit appearance on said first digit level of said first selector.

12. In a telephone system, a private branch exchange, a central office, a plurality of outgoing trunks connecting said branch exchange to said central office and normally seizable at said exchange on dialing of a predetermined signal at said exchange, a plurality of data links interconnecting said exchange and said central office, means responsive to the dialing of a different predetermined signal for seizing one of said data links and associating therewith an idle one of said outgoing trunks, means for registering a condensed dialing code and for transmitting said condensed code over said one data link to said central office, means in said central office for translating said condensed code into a directory code and for transmitting said directory code back to said exchange, and means at said exchange responsive to receipt thereat of said directory code for applying said directory code to said idle one of said outgoing trunks to said central office.

References Cited in the file of this patent
UNITED STATES PATENTS

| | | |
|---|---|---|
| 2,274,759 | Wicks | Mar. 3, 1942 |
| 2,951,908 | Malthaner et al. | Sept. 6, 1960 |